US00RE40966E

(19) United States
(12) Reissued Patent
Niska et al.

(10) Patent Number: US RE40,966 E
(45) Date of Reissued Patent: Nov. 10, 2009

(54) OPEN 'PLUG AND PLAY' O AND M ARCHITECTURE FOR A RADIO BASE STATION

(75) Inventors: Hakan Niska, Linköping (SE); Bo Kvarnstrom, Linköping (SE); Jan Oom, Rimforsa (SE)

(73) Assignee: Telefonaktiebolaget LM Ericsson (publ), Stockholm (SE)

(21) Appl. No.: 10/094,586
(22) Filed: Mar. 11, 2002

Related U.S. Patent Documents

Reissue of:
(64) Patent No.: 6,041,228
Issued: Mar. 21, 2000
Appl. No.: 08/958,337
Filed: Oct. 27, 1997

(51) Int. Cl.
*H04M 3/00* (2006.01)

(52) U.S. Cl. ..... 455/419; 455/418; 455/423; 455/424; 455/560; 455/561; 719/311

(58) Field of Classification Search ..... 455/418, 455/419, 423, 424, 432.2, 560, 561, 446, 455/507, 508, 69, 70, 68, 404, 420; 719/311; 717/168, 169, 170, 171, 172, 173, 174, 175, 717/176, 177, 178
See application file for complete search history.

(56) References Cited

U.S. PATENT DOCUMENTS

| | | | | | |
|---|---|---|---|---|---|
| 5,016,269 | A | * | 5/1991 | Rogers | 455/404 |
| 5,265,150 | A | * | 11/1993 | Helmkamp et al. | 455/11.1 |
| 5,353,332 | A | * | 10/1994 | Raith et al. | 455/444 |
| 5,434,798 | A | * | 7/1995 | Madebrink et al. | 455/423 |
| 5,436,955 | A | * | 7/1995 | Kaewell, Jr. et al. | 455/553 |
| 5,526,489 | A | * | 6/1996 | Nilakantan et al. | 709/228 |
| 5,541,978 | A | * | 7/1996 | Brunner et al. | 455/423 |
| 5,544,163 | A | * | 8/1996 | Madonna | 370/352 |
| 5,566,388 | A | * | 10/1996 | Brame et al. | 370/340 |
| 5,584,049 | A | * | 12/1996 | Weaver, Jr. et al. | 455/67.1 |
| 5,842,138 | A | * | 11/1998 | Lu et al. | 455/560 |
| 5,842,210 | A | * | 11/1998 | Chen et al. | 455/418 |
| 5,862,477 | A | * | 1/1999 | Wellard et al. | 455/446 |
| 5,864,764 | A | * | 1/1999 | Thro et al. | 455/446 |
| 5,887,156 | A | * | 3/1999 | Subramanian et al. | 455/446 |
| 5,940,768 | A | * | 8/1999 | Thro et al. | 455/507 |
| 5,974,322 | A | * | 10/1999 | Carlsson et al. | 455/446 |
| 6,041,228 | A | * | 3/2000 | Niska et al. | 455/419 |
| 6,058,314 | A | * | 5/2000 | Seok et al. | 455/424 |
| 6,278,697 | B1 | * | 8/2001 | Brody et al. | 370/310 |

FOREIGN PATENT DOCUMENTS

| | | |
|---|---|---|
| EP | 0 876 072 | * 11/1998 |
| GB | 2 282 299 | * 3/1995 |
| WO | 96/14720 | * 5/1996 |

OTHER PUBLICATIONS

Hartley, et al., "Automatic Configuration of Base Stations to Audio Slots", Motorola Technical Developments, vol. 16, Aug. 1992, pp. 155 and 156.*

"Global System For Mobile Communications: Digital Cellular Telecommunications System (Phase 2); Network Management (NM) Procedures and Messages on the A–bis interface (GSM 12.21)" European Telecommunication Standards Institute, France, Jun. 1996.*

* cited by examiner

*Primary Examiner*—Charles N Appiah
*Assistant Examiner*—Olumide T Ajibade Akonai
(74) *Attorney, Agent, or Firm*—Nixon & Vanderhye P.C.

(57) ABSTRACT

A method and apparatus for preparing a vendor- and version-independent information model that a cellular telephone base station can use to communicate its capabilities in a plug and play fashion to a network element is disclosed. The information model can also be used to communicate configuration information back to the base station from the network element. The capabilities and configuration information is automatically communicated and utilized, thus reducing the possibility of human operator error in configuring and pre-configuring new or modified base station equipment.

63 Claims, 5 Drawing Sheets

OPEN 'PLUG AND PLAY' O AND M ARCHITECTURE FOR A RADIO BASE STATION

Matter enclosed in heavy brackets [ ] appears in the original patent but forms no part of this reissue specification; matter printed in italics indicates the additions made by reissue.

FIELD OF THE INVENTION

This invention relates to cellular mobile telephone systems, and more particularly to base station designs for such systems.

BACKGROUND OF THE INVENTION

Cellular mobile telephone systems operate by dividing geographic areas into cells. The network is configured so that interference between the cells is minimized. Groups of cells are serviced by assigned base stations to act as the radio interface between mobile telephones within the cells communicating with other telephones within or outside of their own cell. When a mobile telephone within a particular cell places a "call," it does so by sending a message to the Base Station assigned to its cell by identifying which telephone (or network server) it wishes to communicate with. The Base Station can communicate the message to a Mobile Network for [firer] *further* communication to another Base Station (to connect the caller to the desired other telephone), or can communicate the message to an appropriate Network Server (to connect the caller to some type of Network service).

Several factors can affect the size and type of the cells that the Base Stations service. A common occurrence is the dramatic enlargement of the density of mobile telephones within a particular cell such that the capacity of a Base Station servicing the cell becomes overly taxed. In such cases, the cell can be subdivided and additional Base Stations can be added to service the smaller geographic cell areas. Today, for example, a Mobile Telephony Network may employ 3000 Base Station sites, with annual expansion of 500 new Base Station sites being realistic. Other changes can also affect the cell servicing. For example, newer and improved Base Station technologies are being developed, which may be desirable for a particular cell location. In such cases, the replacement of an existing Base Station in a cell area with the improved design may occur.

When such changes occur in the Base Stations servicing a particular cell, the Base Station must be configured to perform the tasks common to cells in general and unique to the cells that the Base Station is servicing. This configuration process usually employs the identification of the systems used by the new Base Station and the customization of those systems to the particular application. One such system is the Operation and Support System, which as used in this disclosure, means an application for certain operation and maintenance functions that can exist both on an element level (to manage a single network element such as a Base Station) and on a Network level (to manage a whole telephony network). The term Element Management refers to the operation and management of a single network element and the term Network Management refers to the operation and management of an entire network. Typical Element Management activities relevant to the present invention include (without limitation) installation, commissioning, hardware supervision, and software supervision of a single network element. Typical network management activities include (without limitation), setting up message routing information, supervising network performance, collecting accounting information, etc.

Whenever a Base Station is added into traffic service, or when hardware is added to, changed, or removed from an existing Base Station, the modification will by necessity require some type of reconfiguration in the Mobile Network that uses the existing Base Station. The cost (for e.g., introducing a new Base Station into a cell that is currently operating too close to the Base Station's capacity), is primarily in cell planning, site establishment, hardware establishment, and Mobile Network reconfiguration. The present invention addresses the last of these costs, Network reconfiguration, regardless of the impetus for the reconfiguration.

Currently, Network reconfigurations are performed manually. First, a new base station is installed. Then, Network (cell) planning occurs to determine the capacity of the installed hardware. (Note that a base station of any capacity can be installed anywhere and the network can then be configured to make the best use of it in the network). A Network Operator manually preconfigures the Mobile Network to accept and use the new Base Station or Base Station equipment. The Operator then informs the Base Station installation team which preconfiguration details are used so the team can introduce them to the element manager at the Base Station site. Because Base Station technology evolves, the types of Base Station equipment, the types of preconfigurations, the types of hardware and software, the upgrade characteristics, etc. of the thousands of Base Stations employed in an entire Mobile Telephony Network simply cannot realistically be made uniform. We expect that different types of Base Stations and different types of Base Station equipment will be employed throughout a Mobile Telephone Network. Thus, administration (and preconfiguration) of many different kinds of Base Stations and Base Station equipment cannot be avoided. But, currently, the preconfiguration of these many different types of hardware must be performed both at the element management level and at the network management level, which introduces additional costs, and which introduces the possibility that the information loaded into these two different management levels (one by the network operator and the other by the installation team) is not consistent due, for example, to human operator input errors.

SUMMARY OF THE INVENTION

The present invention aims to reduce the cost of reconfiguring a Mobile Network whenever a Base Station is added or removed from the traffic switch. The present invention eases the manual configuration burden that occurres whenever a Base Station is added to or removed from a Mobile Network by employing a Plug and Play routine within the Base Station. In this way, when a new Base Station is introduced to the Network, the Base Station itself states its traffic capabilities to the Mobile Network. The Mobile Network automatically processes the capabilities data into a configuration (frequencies of operation, control channels, etc.) for the Base Station.

In a further aspect of the invention, the Base Station communication of its capability to the Network is in a standard format so any Mobile Network can understand it.

DESCRIPTION OF THE FIGURES

Other advantages and objects of the present invention will be described in detail with reference to the accompanying drawings, in which.

DETAILED DESCRIPTION OF THE PRESENTLY PREFERRED EMBODIMENTS

In a Mobile Telephony system today, an operator must administer a large number of different types and configurations of Base Stations. As changes occur in mobile telephone use within a particular region, changes necessarily occur to the hardware and software servicing that telephone use. When a new Base Station is added to a system, for example, telephone operating companies must ensure that the cell planning, maintenance, and equipment expansion is accurately and expeditiously carried out. In fact, such planning must necessarily occur even when an existing Base Station is simply ungraded.

One aspect of a mobile network reconfiguration involved getting the Mobile Network acquainted with the equipment or upgrades being introduced at a particular Base Station. In the past, this was accomplished by having a human operator interface via a computer with the Mobile Network to introduce the Network to the particular configurations that would ultimately be employed at the Base Station. Then, another human operator would interface via another computer with the Base Station and configure the Base Station in accordance with the information provided to the Mobile Network. This involved three steps: the first human preconfigured the network at the network control site, the first human verbalized the preconfiguration data to a second human at the Base Station site, and then the second human preconfigured the Base station in accordance with the data verbalized to him.

The present inventors have discovered that the process of configuring new Base Station Equipment and Upgrades can be accomplished much more easily by pre-programming the Base Station to introduce itself to the Network by informing the Network about its capabilities. The Network then considers the Base Station capabilities and re-designs the traffic parameters and characteristics in accordance with the capabilities of all of its element nodes, including those of the new Base Station. Finally, based on the redesign, the Network communicates pre-configuration data to the Base Station, which the Base Station loads and employs in its normal operation.

With the automated preconfiguration of both the Base Station and the Network, new equipment can be introduced at a Base Station site without requiring human operators to simultaneously preconfigure the Base Station and the Network.

Figure 1:
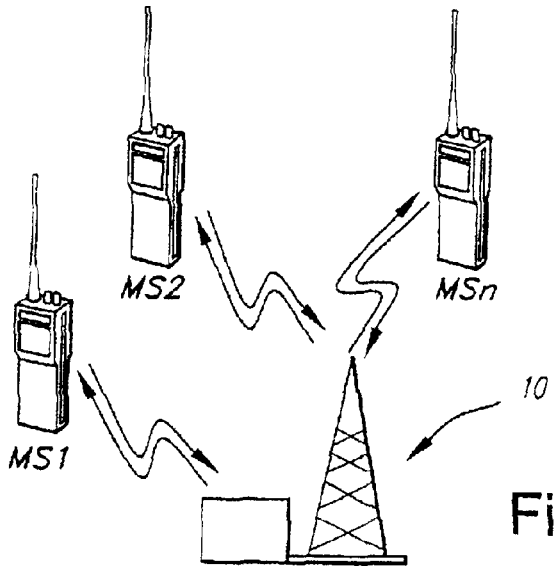
FIG. 1 is a schematic example representation of mobile stations and a base station that may be employed in accordance with the present invention.
Figure 2:
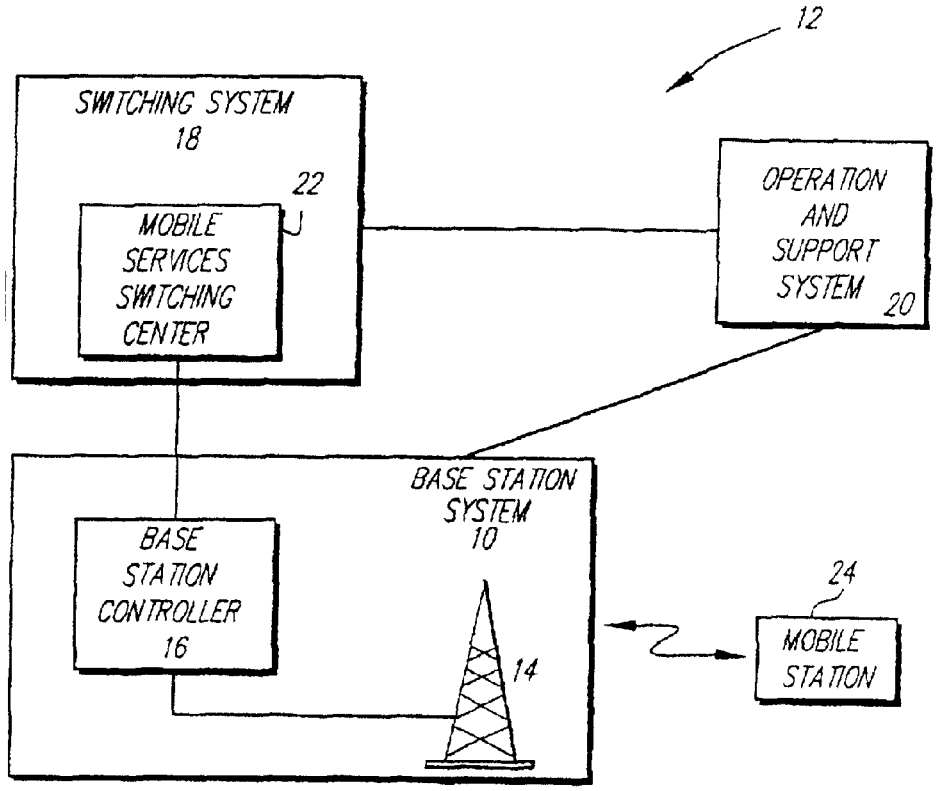
FIG. 2 is a schematic example representation of a base station, switching system, and operation system employed according to an example embodiment of the present invention.
Figure 3:
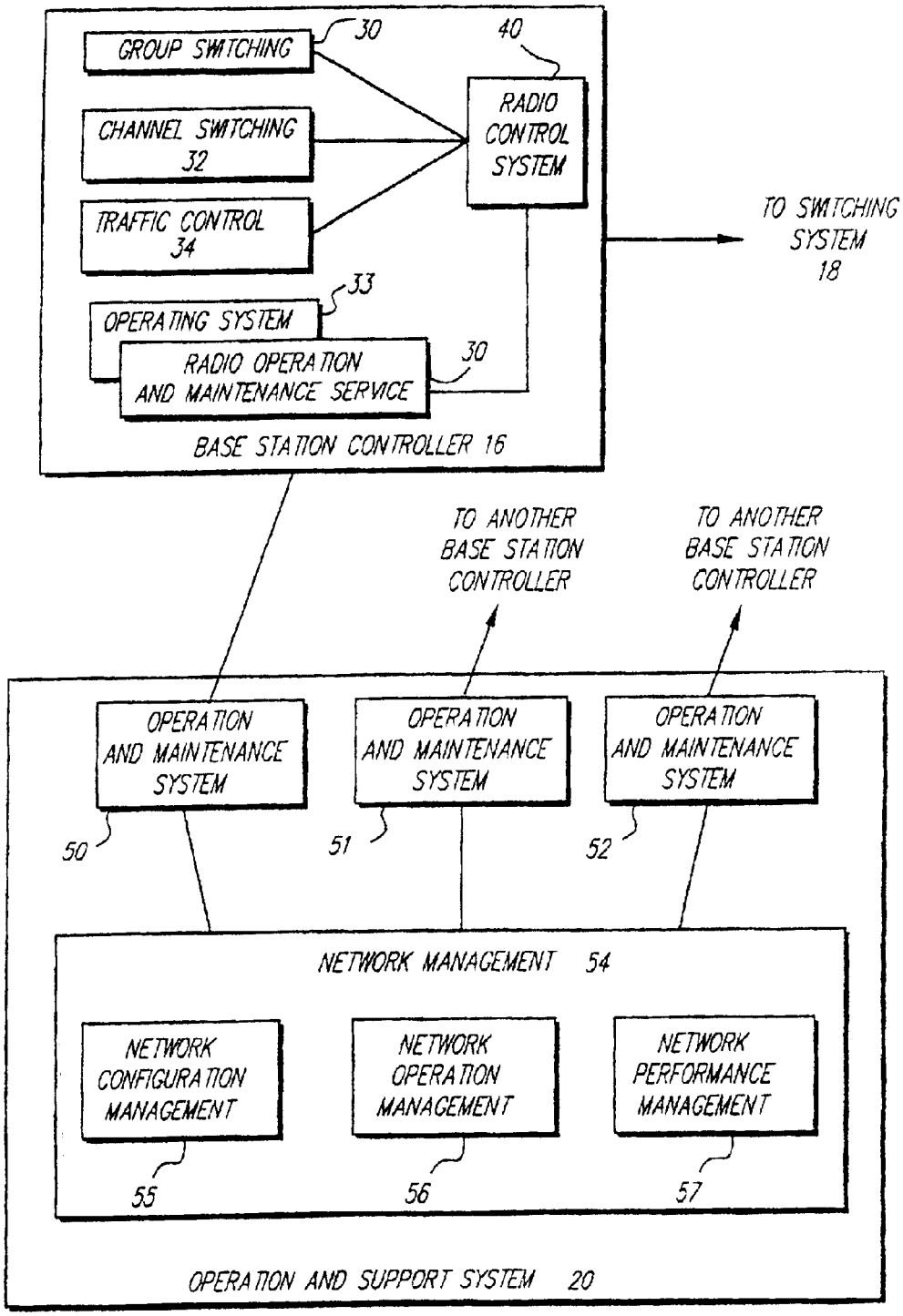
FIG. 3 is a schematic example representation of more detailed subsystems within the example embodiment of FIG. 2.

FIGS. 1 through 3 show example schematics of the Base Stations and the Mobile Network to which they communicate. Each base station 10 services a number of different mobile stations, such as cellular telephones MS1 through MSn. The mobile stations communicate with the base station 10 by sending and receiving messages for other mobile stations or to other network components.

As shown in FIG. 2, the telephony network 12 includes the base station system 10 which includes a radio base station 14 in electrical communication with a base station controller 16. The base station system 10 communicates with a switching system 18 through the base station controller 16 and a mobile services switching center 22. Typically, the switching system 18 will service a number of different base station systems 10 and thus will receive messages from a number of different base station controllers 16. The switching system is physically separate and remote from the base stations 10 that is services. Also included in the telephony network 12 is an operation and support system 20 that may be physically proximate to the switching system 18 or may be a separate facility.

The switching system 18 is generally responsible for call processing and subscriber services. It keeps databases identifying in which cells the mobile stations usually reside, where they are physically located during any given call, and which subscriber functions the mobile station is authorized to use. The switching system 18 also provides access to outside networks such as ISDN services, foreign exchanges, etc. The base station system 10 performs all of the radio-related functions for the mobile stations 24 communicating with it. The base station system 10 includes the bases station controller 16 to handle cell configuration data and channel assignments for the base station system 10. Finally, the Operation and Support System 20 handles errors on the network and configures the switching system and base station system controllers.

FIG. 3 shows some relevant aspects of the base station controller 16 and the operation and support system 20 in greater detail. The base station controller 16 communicates with the operation and support system 20 via an assigned operation and maintenance system 50 within the operation and support system 20. The operation and support systems 20 includes a plurality of such operation and maintenance systems 50–52, generally (though not necessarily) on a one-to-one basis with the base station controllers that the operation and support system 20 must maintain.

Just to illustrate an example base station controller, the base station controller 16 of FIG. 3 includes several hardware and software subsystems including group switching 30, channel switching 32, traffic control 34, radio operation and maintenance 36 and radio control 40. Other or different subsystems may also be employed within the base station controller, so the example of FIG. 3 can be modified in accordance with the services and hardware being employed in a particular base station application. The group switching subsystem 30 is software and hardware that is responsible for selection, connection and disconnection of signal paths. The channel switching subsystem 32 is responsible for signaling and routing of messages. The traffic control subsystem 34 is responsible for setup and supervision of calls. The radio control system 40 administers the radio network. The radio operation and maintenance subsystem 36 is responsible for that internal operation and maintenance. What is important for purposes of the present invention is not the type or division of responsibilities within the base station controller 16, but that somewhere within the controller is an internal operation controller that relies upon some type of operation system [38] *33* for configuring the operational characteristics of the subsystems within the base station system 10.

These operational characteristics are unique to each base station and can include, among other data, hardware and software capacity information, geographical cell configuration information, base station identity codes, RF channel numbers assigned to the cells in a base station's service area, maximum output power levels per cell, neighboring cell frequencies, etc. When base stations are added to a network or are modified, when cells are reconfigured, or when frequencies of operation are reallocated, these operational characteristics change. The base station system 10 must be informed of the changes and re-configured to accommodate the changes. In addition, the operation and maintenance system 50 in the operation and support system 20 must also be informed and configured to the changes as well.

The operation and support system 20 must be aware of all operational characteristics of the base stations 10 that it services so it can properly manage the entire mobile network via the network manager 54. The network manager is responsible for configuring the entire network via the configuration manager 55. Network operation and performance are also supervised in the network operation manager 56 and the performance manager 57. As one can see from FIG. 3, since the network manager 54 must operate consistently with the capabilities of the base station controllers 16 at the various base stations systems 10 (sometimes numbering in the thousands), the base station controllers 16 must be configured absolutely consistently with what is expected by the network manager 54. The base station has certain hardware and software limits on its capacity and capabilities, while the network manager 54 has certain demands for the base station to process the mobile station 24 messages being sent in the cells serviced by the base station. The operation and support system 20, the base station controller 16 and the base station must exchange information to achieve an agreement on how to use the capabilities in a way that is optimal for the whole network.

With the present invention, when the base station is taken into operation, is modified, or is serviced, it informs the network manager 54 (via communication between the base station controller 16 and the operation and management system 50) what capabilities it has. This capability information can be entered manually by an operator at the base station site, or more preferably is automatically produced by an internal base station process. In order for the base station to transfer this capability information, there must be a common understanding between the base station and the network manager. According to an example embodiment of the present invention, this common understanding is provided by an abstract resource information model (reflecting the base station's capabilities) which is delivered to the mobile network and specifically to the network management 54.

Having received the information model, the mobile network can understand the basic capabilities of the base station and can then use this common model language to configure the base station, and if necessary, adjacent parts of the network. In this way, the base station automatically gives the network manager 54 the capability information that it needs for the configuration manager 55 to configure the network to accommodate the new (or modified) base station and can send the frequencies of operation, control channels, etc. to the base stations for their use.

Figure 4:
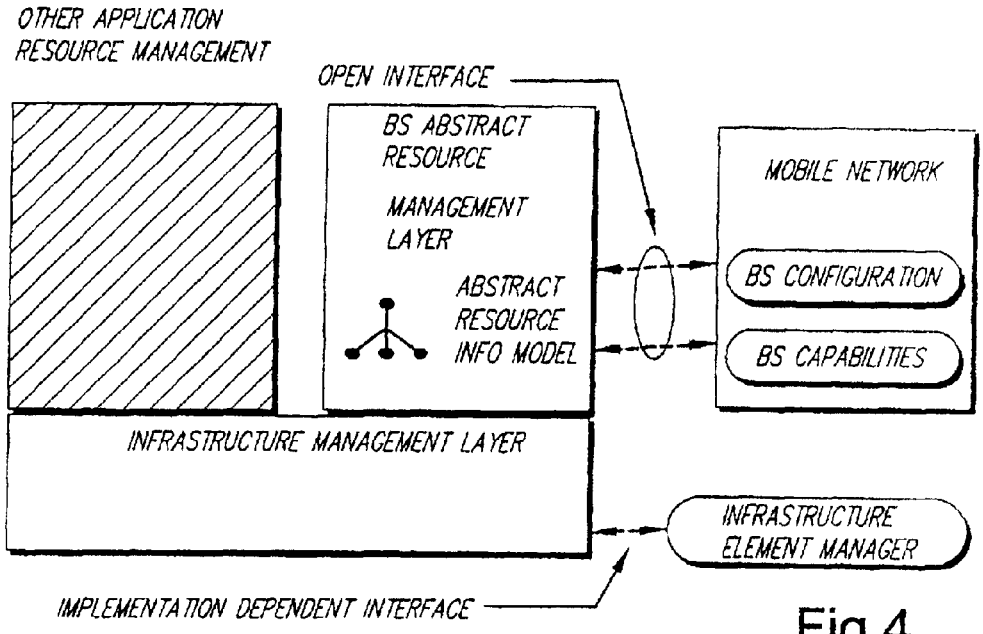
FIG. 4 is a schematic example representation of an example base station according to one aspect of the [preset] *present* invention.

FIG. 4 shows an example base station management architecture to employ the information model according to the present invention. First, the implementation specific parts of the base station are isolated into an infrastructure management layer. Thus infrastructure management layer is specific for the base station implementation and version, and requires its own element management operating system. The infrastructure management layer can be common to several different applications residing in the network element, such as, for example, the transport network function.

The base station then divides out a base station abstract resource management layer which includes the abstract resource information model that will be employed in examining the base station capabilities by the mobile network and in receiving the base station configuration from the mobile network. The abstract information resource model is independent of the base station hardware and software implementation. This layer thus provides an information model that can represent any base station irrespective of its vendor or version.

Figure 5:
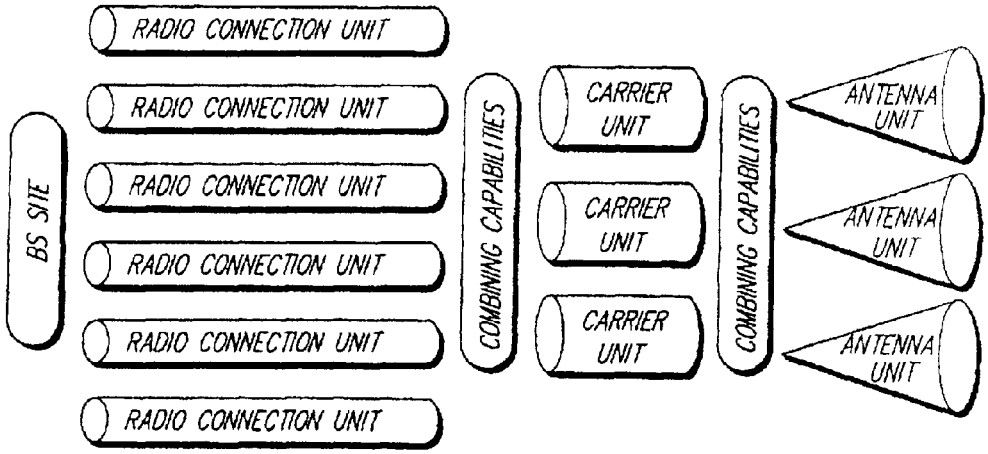
FIG. 5 and 7 are example embodiments of an information model according to the present invention.

An example abstract resource information model as shown in FIG. 5. This is an example only and corresponds to a CDMA base station. This example is only for the purpose of illustrating a potential application of the present invention. The present invention is equally employable in many other, different base station applications. In FIG. 5, the base station site represents the physical base station site in terms of the base station functions relevant to the control of the mobile network. The base station site typically includes attributes like Site ID and geographical position. The base station site also includes information regarding the radio resources contained in the site.

The radio connection units in FIG. 5 are configurable to implement the different types of airborne channels. The radio connection units serve as transport access points for the mobile network. Typical attributes for the radio connection units are channel type, link address, and channel-specific attributes per channel type.

The carrier units in FIG. 5 represent the equipment in the "Radio Near part." Typical attributes for these units are frequency assignment, maximum radiated power, etc.

Figure 7:
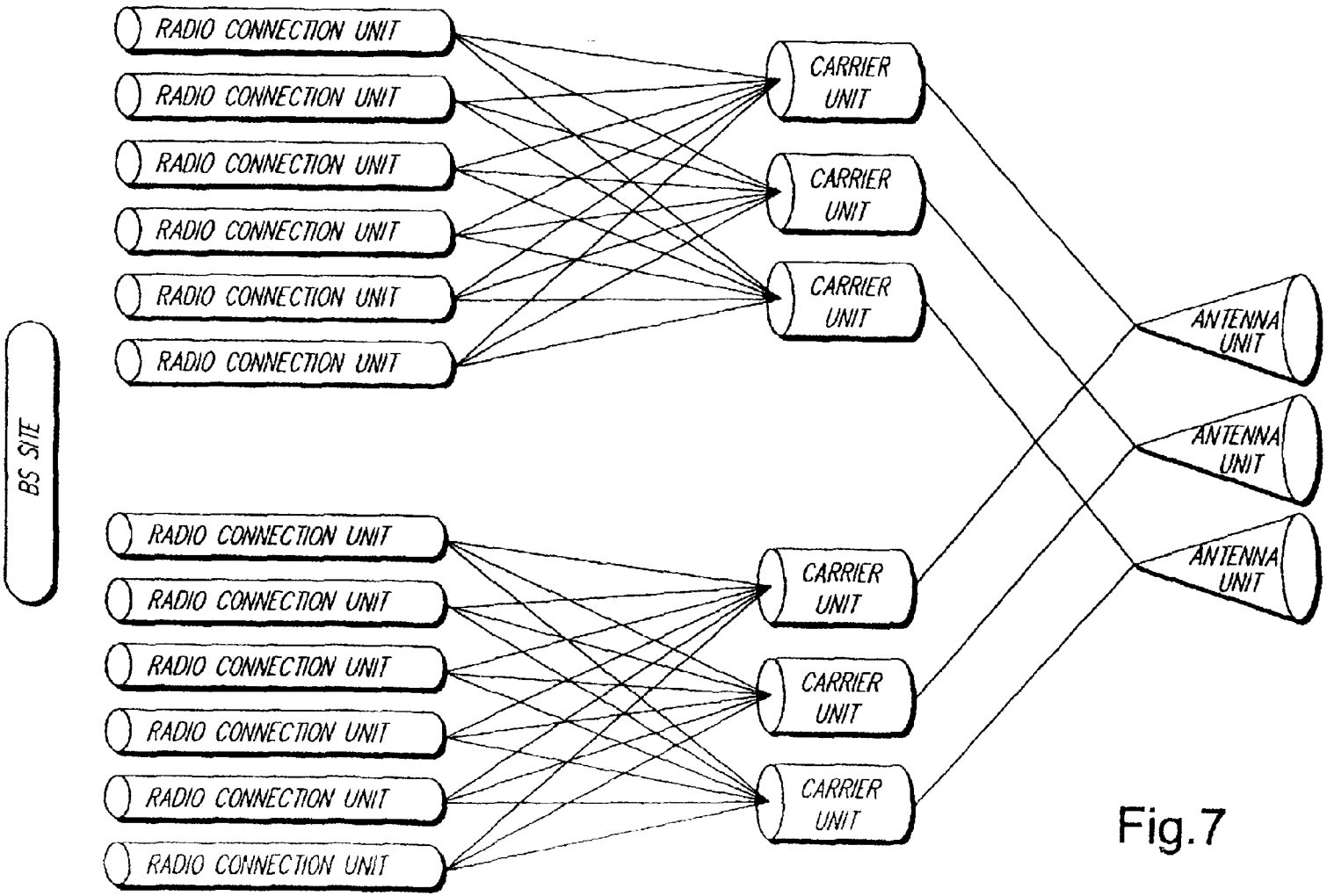

A more detailed example of the FIG. 5 embodiment is shown in FIG. 7, in which the base station site has the capacity of simultaneously carrying twelve radio connections. Each of two groups of six radio connections can then access three dedicated carrier units (which is useful in a CDMA softer handoff case where a mobile connection can consist of more than one "legs" in the air). This example model shows several capacity limitations. For example, the six first connections can only access the air interface using the CDMA frequencies set up in the upper three carrier units. The same limitation exists for the lower six connections. This capacity information is communicated to the mobile network via the FIG. 7 model.

The model of FIG. 7 will show both combination capabilities for the objects and the capabilities for each of the objects. Typical capabilities attributes are described above and include, for example, allowed frequency spectrum, maximum irradiated power per carrier unit, etc.

Figure 6:
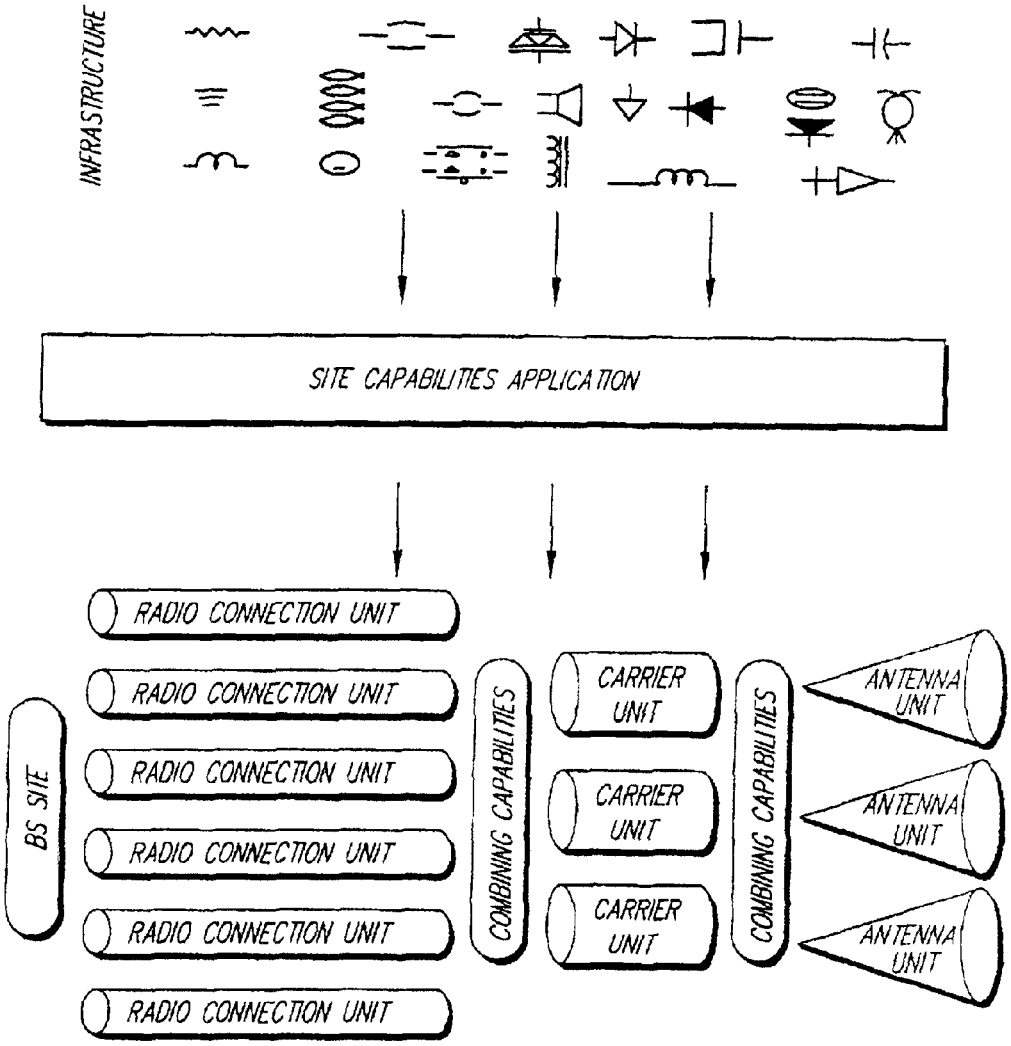
FIG. 6 is an example embodiment of a plug and play capability of the present invention.

The combination of objects in FIG. 5 provide [an] *a* version and vendor-independent model of identifying capacity and configuration information for a base station. To achieve the next aspect of the present invention, in which the base station communicates its capacity information via the model to the network in a "plug and play" fashion, the example embodiment of FIG. 6 can be employed. As shown in FIG. 6, the information model (at the bottom of the figure) must be translated from the base station infrastructure information. A site capabilities application is employed to perform this translation. In particular, the state capabilities application recognizes the infrastructure installed at the base station and builds the abstract information model from it. Of course, the site capabilities application also detects degradation in the base station (faulty units, removed components, etc.) and upgrades in the base station (installed units) and communicates those modifications to the mobile network via the abstract model.

Using a model such as that described above together with a site capabilities application to translate the site infrastructure information into the model, the base station capabilities information can be communicated to the network manager in a "plug and play" fashion and in a vendor- and version-independent way. The site capabilities application is very vendor- (and version-) specific since it depends on the infrastructure management layer. Human administration of the physical site and human error caused by incorrect data entry between the element and network elements are thus reduced.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method bringing a base station *having modified base station capabilities* into existing cellular radio traffic being coordinated by a network manager, comprising the steps of:

pre-loading into the base station capability information corresponding to operational capabilities of the base station;

formatting the pre-loaded capability information into a standardized, predefined abstract resource information model known to the network manager;

communicating to the network manager the capability information formatted into the standardized, predefined abstract resource information model;

retrieving, at the network manager, the capability information from the standardized, predefined abstract resource information model;

developing, at the network manager, configuration information identifying operational parameters for use by the base station, said configuration information developed based on the existing cellular radio traffic being coordinated by the network manager and on the capability information;

formatting the pre-loaded configuration information into the standardized, predefined abstract resource information model;

communicating to the base station the configuration information formatted into the standardized, predefined abstract resource information model;

extracting the configuration information from the standardized, predefined abstract resource information model at the base station; and configuring the base station based on the configuration information.

2. A method according to claim 1, wherein the modified base station capabilities comprise a completely new base station being brought into the cellular radio traffic.

3. A method according to claim 1, wherein the formatting steps include formatting into the standardized, predefined abstract resource information model independent of a vendor and a version of the base station.

4. A method according to claim 3, wherein the base station automatically creates the abstract resource information model based on hardware and software infrastructures of the base station.

5. A method according to claim 4, wherein the abstract resource information model is created using combinational relationships between various hardware and software infrastructure objects of the base station and attribute information for various hardware and software infrastructure objects of the base station.

6. A method according to claim 5, wherein the hardware and software infrastructure objects in the abstract resource information model include frequency spectrum information, maximum power information, and channel type information and wherein the combinational relationships between the objects describe relationships between radio connection units, carrier units and antenna units.

7. A base station, comprising:

a base station resource infrastructure management layer for administration of the base station software and hardware infrastructure;

a base station abstract resource management layer having its own element management operating system based on an abstract information model identifying operational capabilities of the base station software and hardware infrastructure, wherein said information model is independent of any format of said base station software and hardware infrastructure; and a site capabilities application for creating the abstract information model based on the base station software and hardware infrastructure.

8. A base station according to claim 7, further comprising:

an infrastructure element manager for administering the infrastructure management layer.

9. A base station according to claim 7, further comprising:

a communication link with a physically remote mobile network for communicating said operational capabilities to said remote mobile network and for receiving from said remote mobile network configuration information based on the operational capabilities.

10. A base station according to claim 9, wherein:

the operational capabilities and the configuration information are both formatted according to the abstract information model.

11. A base station according to claim 7, wherein the abstract information model defines abstract information objects for the software and hardware infrastructure and combination relationships between the various abstract information objects.

12. A base station according to claim 7, wherein the abstract information model represents the operational capabilities by attributes in abstract information model objects.

13. A base station according to claim 7, wherein the abstract information model defines abstract information objects for the software and hardware infrastructure and combination relationships between the various abstract information objects; and the abstract information model represents the operational capabilities by attributes in abstract information model objects.

14. A base station according to claim 13, wherein the attribute information includes frequency spectrum information, maximum power information, and channel type information.

15. A base station according to claim 13, wherein the combination relationships includes relationships between radio connection units, carrier units and antenna units within the software and hardware infrastructure.

16. A method of bringing a new base station capability into an existing communication network, comprising the steps of:

communicating capabilities of the base station from the base station to the network using a format of a common abstract resource information model;

preparing and communicating operational configuration information for the base station based on the capabilities of the base station and based on a need of the network, said configuration information also being in the format of the common abstract resource information model; and receiving the configuration information at the base station in the format of the common abstract resource information model, and configuring the base station based on the configuration information.

17. A method according to claim 16, wherein the step of communicating the capabilities of the base station includes the step of communicating the capabilities of a completely new base station being brought into an existing radio traffic of the communication network.

18. A method according to claim 16, wherein the base station automatically creates the abstract resource information model based on hardware and software infrastructures of the base station.

19. A method according to claim 18, wherein the abstract resource information model is created using combinational relationships between various hardware and software infrastructure objects of the base station and attribute information for various hardware and software infrastructure objects of the base station.

20. A method according to claim 19, wherein the hardware and software infrastructure objects in the abstract resource information model include frequency spectrum information, maximum power information, and channel type information and wherein the combinational relationships between the objects describe relationships between radio connection units, carrier units and antenna units.

21. A method of bringing a base station having modified base station capabilities into existing cellular radio traffic being coordinated by a network manager comprising the steps of:

automatically sending to the network manager capabilities information corresponding to operational capabilities of the modified base station, said capabilities information being in a format of a common abstract resource information model, and automatically receiving configuration information from the network manager identifying operational parameters for use by the modified base station in administering the cellular radio traffic, said configuration information also being in the format of the common abstract resource information model.

22. A method according to claim 21, wherein the step of communicating the capabilities of the base station includes the step of communicating the capabilities of a completely new base station being brought into an existing radio traffic of the communication network.

23. A method according to claim 21, wherein the base station automatically creates the abstract resource information model based on hardware and software infrastructures of the base station.

24. A method according to claim 23, wherein the abstract resource information model is created using combinational relationships between various hardware and software infrastructure objects of the base station and attribute information for various hardware and software infrastructure objects of the base station.

25. A method according to claim 24, wherein the hardware and software infrastructure objects in the abstract resource information model include frequency spectrum information, maximum power information, and channel type information and wherein the combinational relationships between the objects describe relationships between radio connection units, carrier units and antenna units.

*26. A method of configuring or re-configuring a base station in a communication network, comprising:*

*communicating capabilities of a base station from the base station to the communication network using a format of an abstract resource information model.*

*27. The method in claim 26, further comprising:*

*receiving configuration information from the network controller identifying operational parameters for use by the base station in handling cellular radio traffic.*

*28. The method in claim 26, further comprising:*

*providing operational configuration information to the base station;*

*receiving the operational configuration information at the base station; and*

*configuring the base station based on the operational configuration information.*

*29. The method in claim 28, wherein the operational configuration information is received at the base station in the format of the abstract resource information model.*

*30. The method in claim 28, wherein the configuration information is received at the base station using a commonly understood format.*

*31. A method according to claim 26, wherein the base station is a new base station being installed into the communication network.*

*32. The method in claim 31, wherein the base station is an existing base station to be reconfigured.*

*33. A method according to claim 26, wherein the base station automatically implements the abstract resource information model using hardware and software infrastructures of the base station.*

*34. A method according to claim 26, wherein the base station implements the abstract resource information model using combinational relationships between various logical hardware and software infrastructure objects of the base station and attribute information for the various logical hardware and software infrastructure objects of the base station.*

*35. A method according to claim 34, wherein the logical hardware and software infrastructure objects in the abstract resource information model include one or more of frequency spectrum information, maximum power information, and channel type information, and wherein the combinational relationships between the objects describe relationships between one or more of radio connection units, carrier units and antenna units.*

*36. A method relating to configuring or re-configuring a base station in a cellular radio network, comprising:*

*sending to a network controller capabilities information corresponding to operational capabilities of the base station, the capabilities information being in a format of an abstract resource information model, and*

*receiving configuration information from the network controller identifying operational parameters for use by the base station in handling cellular radio traffic.*

*37. A method according to claim 36, wherein the base station is a new base station being installed into the cellular radio network.*

*38. The method in claim 36, wherein the base station is an existing base station to be reconfigured.*

*39. A method according to claim 36, wherein the base station automatically implements the abstract resource information model based on hardware and software infrastructures of the base station.*

*40. A method according to claim 36, wherein the abstract resource information model is implemented using combinational relationships between various hardware and software infrastructure objects of the base station and attribute information for various hardware and software infrastructure objects of the base station.*

*41. A method according to claim 40, wherein the hardware and software infrastructure objects in the abstract resource information model include one or more of frequency spectrum information, maximum power information, and channel type information, and wherein the combinational relationships between the objects describe relationships between one or more of radio connection units, carrier units and antenna units.*

*42. A method according to claim 36, wherein the configuration information is in the format of the abstract resource information model.*

*43. A method according to claim 36, wherein the configuration information is in a commonly understood format.*

*44. A system for use in a mobile communications network, comprising:*

*a control node associated with the mobile communications network, and*

*a base station configured to communicate its capabilities to the control node using a format of an abstract resource information model.*

*45. The system in claim 44, wherein the control node is configured to receive the base station capabilities and communicate operational configuration information to the base station so that base station is configured using the operational configuration information.*

*46. The system in claim 44, wherein the operational configuration information is in the format of the abstract resource information model.*

*47. The system in claim 44, wherein the operational configuration information is in a commonly understood format.*

*48. The system according to claim 44, wherein the base station is a new base station to be installed into the communication network.*

*49. The system according to claim 44, wherein the base station is an existing base station to be reconfigured.*

*50. The system in claim 44, wherein the base station is configured to automatically implement the abstract resource information model based on hardware and software infrastructures of the base station.*

*51. The system in claim 50, wherein the base station is configured to implement the abstract resource information model using combinational relationships between various hardware and software infrastructure objects of the base station and attribute information for various hardware and software infrastructure objects of the base station.*

*52. The system in claim 50, wherein the hardware and software infrastructure objects in the abstract resource information model include one or more of frequency spectrum information, maximum power information, and channel type information, and wherein the combinational relationships between the objects describe relationships between one or more of radio connection units, carrier units and antenna units.*

*53. A base station configured for addition into an existing cellular radio system coordinated by a control node in the cellular radio system, comprising:*

*radio transmitting and receiving circuitry, and*

*a controller, coupled to the radio transmitting and receiving circuitry, configured to send to the control node capabilities information corresponding to operational capabilities of the base station, the capabilities information being in a format of an abstract resource information model, and to use configuration information received from the control node in transmitting and receiving cellular radio traffic.*

*54. The base station in claim 53, wherein the controller includes:*

*means for automatically implementing the abstract resource information model based on hardware and software infrastructures of the base station.*

*55. The base station in claim 54, wherein the means for automatically implementing uses combinational relationships between various hardware and software infrastructure objects of the base station and attribute information for various hardware and software infrastructure objects of the base station.*

*56. The base station in claim 55, wherein the hardware and software infrastructure objects in the abstract resource information model include one or more of frequency spectrum information, maximum power information, and channel type information pertaining to the radio transmitting and receiving circuitry, and wherein the combinational relationships between the objects describe relationships between one or more of radio connection units, carrier units and antenna units included in the radio transmitting and receiving circuitry.*

*57. The base station in claim 53, wherein the configuration information is received in the format of the abstract resource information model.*

*58. The base station in claim 53, wherein the configuration information is received in a commonly-understood format.*

*59. A method of bringing a new base station capability into an existing communications network, comprising:*

*representing and communicating capabilities of the base station from the base station to the network using a vendor-independent format that can represent any base station irrespective of its vendor;*

*preparing and communicating operational configuration information for the base station based on the capabilities of the base station, said configuration information is communicated in the vendor-independent format; and*

*receiving the configuration information at the base station in the vendor-independent format, and configuring the base station based on the configuration information.*

*60. The method in claim 59, wherein the vendor-independent format is also version-independent.*

*61. The method in claim 60, wherein the vendor-independent and version-independent format corresponds to an information model that can represent any base station irrespective of its vendor or version.*

*62. The method in claim 59, wherein the new base station capability is associated with a new base station being brought into the communication network.*

*63. The method in claim 59, wherein the new base station capability is associated with reconfiguring an existing base station in the communication network.*

* * * * *